United States Patent
Shin et al.

(10) Patent No.: US 8,953,872 B2
(45) Date of Patent: Feb. 10, 2015

(54) METHOD FOR EDITING TERRAIN DATA CREATED BY PROCEDURAL TERRAIN METHOD

(71) Applicant: Electronics and Telecommunications Research Institute, Daejeon (KR)

(72) Inventors: Seung Hyup Shin, Daejeon (KR); Il Kwon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 221 days.

(21) Appl. No.: 13/733,849

(22) Filed: Jan. 3, 2013

(65) Prior Publication Data
US 2013/0169629 A1 Jul. 4, 2013

(30) Foreign Application Priority Data
Jan. 3, 2012 (KR) .................. 10-2012-0000546

(51) Int. Cl.
| | | |
|---|---|---|
| G06K 9/00 | (2006.01) | |
| G06K 9/46 | (2006.01) | |
| G06K 9/03 | (2006.01) | |
| G06T 15/04 | (2011.01) | |
| G06T 17/05 | (2011.01) | |
| G06T 19/20 | (2011.01) | |

(52) U.S. Cl.
CPC .................. *G06T 15/04* (2013.01); *G06T 17/05* (2013.01); *G06T 19/20* (2013.01); *G06T 2210/36* (2013.01); *G06T 2219/2021* (2013.01)
USPC .............. 382/154; 382/248; 382/309

(58) Field of Classification Search
CPC ......... G06T 15/04; G06T 17/05; G06T 19/00; G06T 19/20
USPC .......................... 382/154, 248, 309
See application file for complete search history.

(56) References Cited

U.S. PATENT DOCUMENTS

| | | | | |
|---|---|---|---|---|
| 6,272,448 | B1 * | 8/2001 | Ishii ................................. | 703/2 |
| 6,747,649 | B1 * | 6/2004 | Sanz-Pastor et al. ......... | 345/428 |

(Continued)

FOREIGN PATENT DOCUMENTS

| | | |
|---|---|---|
| JP | 4733116 B2 | 7/2011 |
| KR | 10-1999-0023486 A | 3/1999 |
| KR | 10-2007-0048656 A | 5/2007 |

OTHER PUBLICATIONS

Bernhardt, A; Maximo, A; Velho, L.; Hnaidi, H.; Cani, M.-P., "Real-Time Terrain Modeling Using CPU-GPU Coupled Computation," Graphics, Patterns and Images (Sibgrapi), 2011 24th SIBGRAPI Conference on , vol., no., pp. 64,71, Aug. 28-31, 2011.*

(Continued)

*Primary Examiner* — Utpal Shah

(57) ABSTRACT

The present disclosure relates to a method of editing terrain data created by a procedure method, and particularly to a method of editing terrain data based on multiresolution for intuitively editing high-quality terrain data. To this end, the method of editing terrain data created by a procedure method includes: inputting terrain data in a form of a height map; processing a multiresolution analysis by dividing the input height map for each band; processing a terrain edition based on the multiresolution by adjusting a height value within a predetermined distance from a position selected from the multiresolution analyzed height map; and storing the multi-resolution-based terrain edition processed height map in a form of a progressive mesh.

10 Claims, 3 Drawing Sheets

(56) References Cited

U.S. PATENT DOCUMENTS

| | | | |
|---|---|---|---|
| 7,095,423 B2* | 8/2006 | Cosman et al. | 345/629 |
| 7,154,507 B1* | 12/2006 | Moreton et al. | 345/582 |
| 7,436,405 B2* | 10/2008 | Losasso Petterson et al. | 345/428 |
| 8,730,252 B1* | 5/2014 | Moreton et al. | 345/582 |
| 2002/0060685 A1* | 5/2002 | Handley et al. | 345/582 |
| 2004/0181373 A1* | 9/2004 | Lachman | 703/1 |

OTHER PUBLICATIONS

Howard Zhou et al., "Terrain Synthesis from Digital Elevation Models", Visualization and Computer Graphics, IEEE Transactions on, Jul.-Aug. 2007, pp. 834-848, vol. 13 No. 4, IEEE.

* cited by examiner

METHOD FOR EDITING TERRAIN DATA CREATED BY PROCEDURAL TERRAIN METHOD

CROSS-REFERENCE TO RELATED APPLICATIONS

This application is based on and claims priority from Korean Patent Application No. 10-2012-0000546, filed on Jan. 3, 2012, with the Korean Intellectual Property Office, the disclosure of which is incorporated herein in its entirety by reference.

TECHNICAL FIELD

The present disclosure relates to a method of editing terrain data created by a procedure terrain method, and particularly, to a method of editing terrain data based on multiresolution for intuitively editing high-quality terrain data.

BACKGROUND

According to the recent development of overall computer graphics techniques, a demand for realistically expressing a terrain in digital contents, such as a movie, animation and a game, has highly increased. The configuration of various terrains, such as a mountain, a field, a river and a canyon, to be similar to actual terrains and the reproduction of global/local characteristics of the various terrains are considered as significant factors for improving the quality of the entire contents. Especially, in order to express a terrain of a virtual world of which actual measurement data cannot be used and which is created depending on the imagination of a designer, a technique for maintaining a factor making a watcher feel as if he/she is actually positioned in a certain place while being capable of illustrating various characteristics of the terrain in an exaggerative manner is necessary.

Terrain creation methods used in most productions are conceived based on the fact that most terrains have fractal characteristics. For example, in a case of a mountain peak, it is known that topographical characteristics of various sizes, such as a curve of a mountain chain, a mountaintop and a small hill, statistically have the similar properties. Based on this fact, the terrain creation methods based on a procedure function have been developed so as to produce very realistic terrain data without a physical modeling of an actual terrain production process by combining 2D noise functions defined in several frequency bands by various methods and randomly adjusting a fractal dimension.

The Perlin noise function published in 1980's has been successfully used for generating various patterns, such as a cloud, a stone surface and marble, as well as a terrain. Methods including a fractional Brownian motion method and a multifractal method employing the Perlin noise further expanded a terrain shape based on the Perlin noise that was slightly restricted. In the meantime, "Zhou", and the like suggested a method of obtaining a terrain by re-using actual terrain measurement data, instead of using the procedure function. The method obtained a more realistic terrain based on an image drawn by a user by expanding an existing texture synthesizing method.

In the meantime, in an actual image production site, a method of capable additionally modifying terrains created through various methods, as well as a quality of the terrain, in accordance with a demand of an artist is essentially necessary. Most terrain edition methods are based on a brush interface using a weight function in a Gaussian form. However, when a local height of a terrain is adjusted through the brush interface, there occurs a problem in that the terrain is damaged into a curve or a detail having a size undesired by a user.

SUMMARY

The present disclosure has been made in an effort to provide a method of editing terrain data created by a procedure method for modifying terrain data obtained through various terrain creation methods in accordance with a demand of a user.

The present disclosure also has been made in an effort to provide a method of editing terrain data created by a procedure method, which can select and adjust terrain details at various levels according to a desire of a user for editing terrain data based on multiresolution.

An exemplary embodiment of the present disclosure provides a method of editing terrain data created by a procedure method, the method including: inputting terrain data in a form of a height map; processing a multiresolution analysis by dividing the input height map for each band; processing a terrain edition based on the multiresolution by adjusting a height value within a predetermined distance from a position selected from the multiresolution analyzed height map; and storing the multiresolution-based terrain edition processed height map in a form of a progressive mesh.

According to the exemplary embodiments of the present disclosure, the method of editing the terrain data created by the procedure method edits the terrain data based on the multiresolution, thereby restrictively editing the details at a desired level.

The method of editing the terrain data created by the procedure method reconfigures the terrain data in the progressive form, thereby minimizing a popping effect caused when the level of details (LoD) is applied to real-time navigation.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
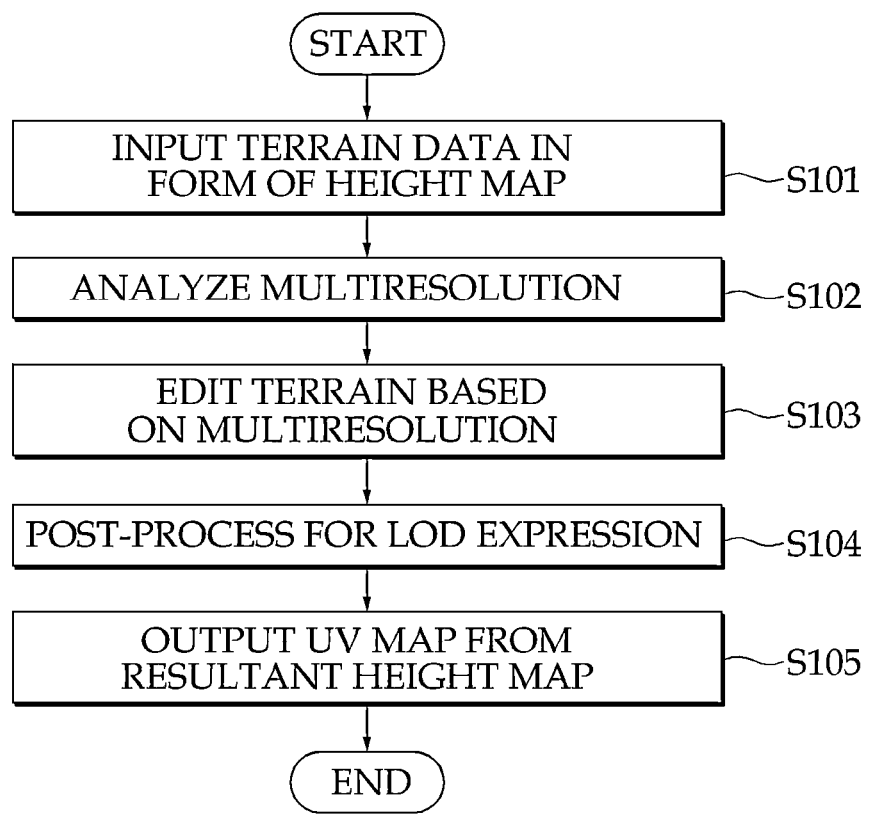
FIG. 1 is a flowchart illustrating a procedure for editing terrain data created by a procedure method according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of the present disclosure will be described with reference to the accompanying drawing in detail. The configuration of the present disclosure and a corresponding operative effect will be clearly understood through the detailed description below.

In the following description, the same elements will be designated by the same reference numerals although they are shown in different drawings, and a detailed explanation of known related functions and constitutions may be omitted so as to avoid unnecessarily obscuring the subject manner of the present disclosure.

Prior to describing the present disclosure, terms used in the present disclosure will be described. In the present disclosure, a term, "height map", means a material structure in which a vertical height is set to each point of a 2D regular grid. In the meantime, a change in a vertical height is the largest characteristic of terrain data as viewed from a large size, and thus it may be effective to express the terrain data as the height map.

A "multi-resolution method" means a technique for analyzing or partially editing given data while considering to the given data being as the combination of signals in various frequency bands. A "difference image" means an image storing a difference between values of two pixels corresponding to two images having the same resolution.

As illustrated in FIG. 1, in a method of editing a terrain according to the present disclosure, a height map obtained by a procedure method or another terrain creation method is first input (S101), and then a height map modified through a multiresolution-based edition is output (S102 to S105). Specifically, the step may be divided into a step of analyzing multiresolution of terrain data (S102), a step of editing the terrain based on the multiresolution (S103), a step of expressing a level of detail (LoD) for high-speed rendering (S104), and a step of outputting a UV map from the resultant height map (S105).

Hereinafter, after the detailed steps of FIG. 1 will be described in detail, a method of selecting a material structure appropriate for the edition of the multiresolution will be described in detail.

Height Map

Figure 2:
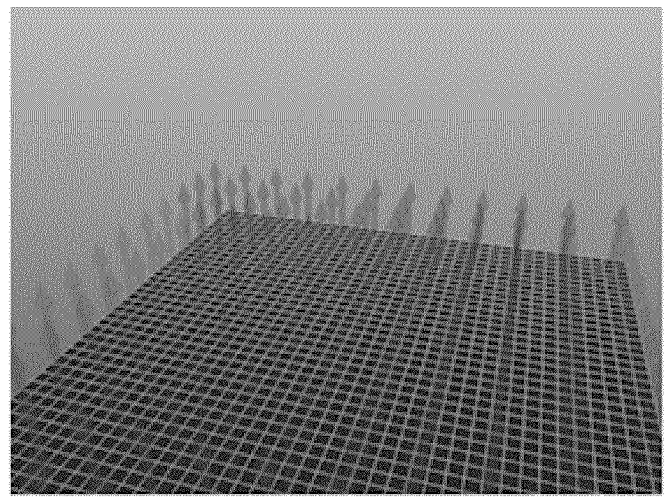
FIG. 2 is a view illustrating a height map with a basic 2D grid according to an exemplary embodiment of the present disclosure.
Figure 3:
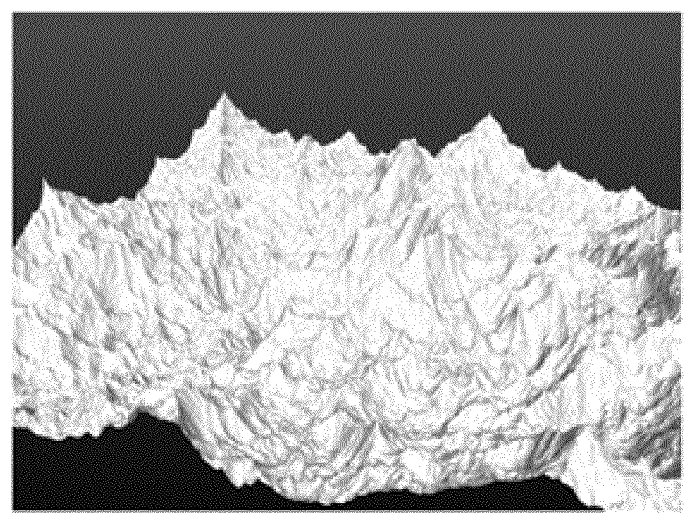
FIG. 3 is a view illustrating a rendering result of height map data of FIG. 2.

First, as illustrated in FIGS. 2 and 3, terrain data for the edition is input in a form of a height map. FIG. 2 is a view illustrating the height map with a basic 2D grid, and FIG. 3 is a view illustrating a rendering result of height map data of FIG. 2.

In the meantime, for the convenience of description, it is assumed that the resolution of the height map is in a form of a multiplier of 2.

Multiresolution Analysis

As described above, when the height map data is input, a multiresolution analysis of the input height map data is next performed.

In the meantime, the height map may be considered as single resolution data in which frequencies of several bands are combined into one. Accordingly, in order to edit the multiresolution, a multiresolution analysis operation for dividing the input height map for each band needs to be preceded. The height map may be analyzed as a 2D grey scale image in which pixel brightness corresponds to a height. Accordingly, the multiresolution analysis of the height map is possible by introducing an image pyramid method of expressing the 2D grey scale with a sum of a base image and a wavelet for each resolution.

Hereinafter, the multiresolution analysis method according to the exemplary embodiment of the present disclosure will be described in detail.

First, the input height map is defined as H, and it is assumed that the resolution of H is $(2^J)*(2^J)$. In this case, an image obtained by down-sampling the original height map H with half resolution $(2^{J-1})*(2^{J-1})$ is referred to as $H_{J-1}$. A difference image from the original image is obtained after up-sampling $H_{J-1}$ with the original resolution again, to be defined as $B_J$ as represented in Equation 1.

$$B_J = H - H_{J-1}$$ [Equation 1]

Accordingly, when $H_{J-1}$ and $B_J$ are recognized, the original height map H may be reconfigured as Equation 2 below.

$$H = B_J + H_{J-1}$$ [Equation 2]

When Equation 2 is recursively performed on $H_{J-1}$, H may be defined as Equation 3 below.

$$H = B_J + B_{J-1} + B_{J-2} + \ldots + B_1 + H_0$$ [Equation 3]

In this case, each B is a wavelet coefficient of the original height map H, and $H_0$ is a base image of lowest resolution. Each B has a band-limited property that B is defined within a limited frequency band.

Noise-Based Terrain Data

Next, a procedure terrain creation method based on noise, such as fBm, is obtained from a noise image divided for each frequency band as represented in Equation 4 below.

$$H = a^1 \times N(2^1) + a^2 \times N(2^2) + a^3 \times N(2^3) + \ldots$$ [Equation 4]

In this case, a is a parameter controlling a contribution degree of an image for each band.

In a case of the use of the aforementioned terrain creation method, when $a^i * N(2^i)$ is considered as the wavelet coefficient, the multiresolution image is obtained without a separate multiresolution analysis. However, a case in which $N(2^i)$ is not limited to a specific frequency band according to the noise function used in the terrain creation may be incurred, and thus when there is a concern about the generation of defects to the resultant height map, the aforementioned multiresolution analysis is performed.

Multiresolution-Based Terrain Edition

Basically, most terrain edition methods are methods of increasing or decreasing a height value within a predetermined distance from a selected position. In this case, in order to prevent discrepancy with a neighboring region of which a height is not changed, a radial basis function (RBF) of a limited size is used as a weight function. However, the method performs scaling without discrimination of the characteristics having various sizes mixed in a terrain surface, and thus it is difficult to modify the terrain in a manner desired by the user. For example, when the height map is edited in order to increase a height of an entire mountain, even a local characteristic, such as a small hill, is extended, and thus a problem of obtaining an unrealistic result may be generated. In order to avoid the problem, an anisotropic Gaussian function covering a frequency space and an image space as expressed in Equation 5 below is used as the weight function.

$$G = e^{\{-a(x^2+y^2)/\delta_{xy} - bz^2/\delta_z\}}$$ [Equation 5]

In this case, the image space is defined in an x-y axis, the frequency space is defined in a z-axis, and $\delta_{xy}$ and $\delta_z$ define widths of a Gaussian kernel in the image space and the frequency space, respectively. The user may set a changed range as desired by appropriately adjusting $\delta_{xy}$ and $\delta_z$.

Figure 4:
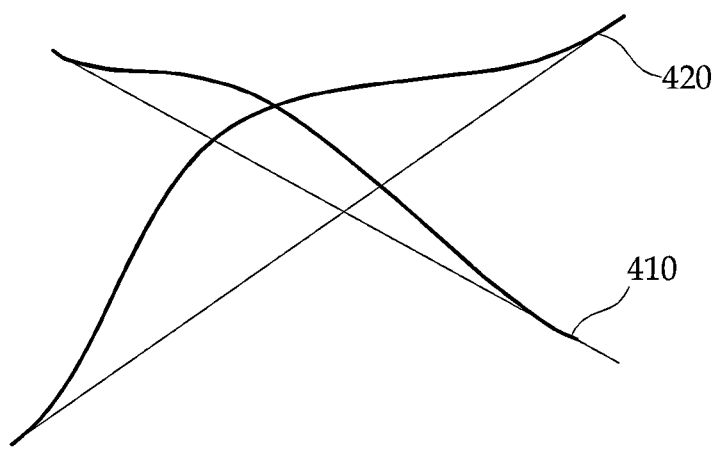
FIG. 4 is a graph illustrating a weight function based on an anisotropic Gaussian function on a 2D plane according to an exemplary embodiment of the present disclosure.

FIG. 4 is a graph illustrating a weight function based on the anisotropic Gaussian function on a 2D plane. Referring to FIG. 4, an image space 410 is defined in an x-y axis, and a frequency space 420 is defined in a z-axis. Accordingly, the weight function based on the anisotropic Gaussian function may be expressed as illustrated in FIG. 4.

Post-Processing for LoD Expression

The terrain data itself expressed with the multiresolution according to the exemplary embodiment of the present disclosure is available for an LoD-based rendering. Accordingly, the data of the terrain remotely positioned from a camera is a basic map with low resolution, and all details of a zoomed-in terrain are expressed, thereby preventing the waste of memory capacity and achieving high-speed rendering. However, when a wavelet coefficient of a different frequency band is added, an image popping effect may occur. In order to reduce the image popping effect, it is necessary to store the height map obtained according to the edition result in a form of a progressive mesh.

Resultant Height Map

Generally, the height map is covered with a texture map or an additional normal map for use, rather than the height map itself is used. In order to support this, a UV map in which the height map is applied to a 2D plane is simultaneously output. The created height map and UV map may be input in general purpose modeling software to be directly used for the scene configuration, or may also be directly applied to rendering software to be used for obtaining a distant view image.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of editing terrain data created by a procedure method, the method comprising:
   inputting terrain data in a form of a height map;
   processing a multiresolution analysis by dividing the input height map for each band;
   processing a terrain edition based on the multiresolution by adjusting a height value within a predetermined distance from a position selected from the multiresolution analyzed height map; and
   storing the multiresolution-based terrain edition processed height map in a form of a progressive mesh.

2. The method of claim 1, further comprising:
   after the storing of the multiresolution-based terrain edition processed height map in the form of the progressive mesh, outputting a UV map in which the height map is applied to a 2D plane.

3. The method of claim 1, wherein the height map is configured with a value of a vertical height set to each point of a 2D regular grid.

4. The method of claim 1, wherein resolution of the height map is expressed in a form of a multiplier of 2.

5. The method of claim 1, wherein the multiresolution analysis is performed by configuring the height map into a 2D grey scale image in which a pixel brightness corresponds to a height, and expressing the 2D grey scale with a sum of a base image and a wavelet for each resolution.

6. The method of claim 5, wherein the height map H is analyzed with an equation below:

$$H = B_J + B_{J-1} + B_{J-2} + \ldots + B_1 + H_0,$$

wherein each B is a wavelet coefficient of the original height map H, and $H_0$ is a base image of lowest resolution.

7. The method of claim 6, wherein the wavelet coefficient B is defined within a limited frequency band.

8. The method of claim 1, wherein the terrain edition based on the multiresolution uses a weight function of an anisotropic Gaussian function covering a frequency space and an image space.

9. The method of claim 8, wherein the weight function is defined by an equation below:

$$G = e^{\{-a(x^2+y^2)/\delta_{xy} - bz^2/\delta_z\}},$$

wherein the image space is defined in an x-y axis, a frequency space is defined in a z-axis, and $\delta_{xy}$ and $\delta_z$ define widths of a Gaussian kernel in the image space and the frequency space, respectively.

10. The method of claim 9, wherein the weight function is possible to set a range changed by adjusting the $\delta_{xy}$ and $\delta_z$.

\* \* \* \* \*